US008763765B2

(12) United States Patent
Ebner et al.

(10) Patent No.: US 8,763,765 B2
(45) Date of Patent: Jul. 1, 2014

(54) PLUNGER ROD ADJUSTER FOR COMPACT BRAKE CALIPER UNITS, HAVING AN ADJUSTING LEVER THAT ABUTS ON AN ELASTIC STOP

(75) Inventors: Christian Ebner, Augsburg (DE); Michael Lehneis, Munich (DE); Diego Rodriguez, Munich (DE)

(73) Assignee: Knorr-Bremse System fur Schienenfahrzeuge GmbH, Munich (DE)

( * ) Notice: Subject to any disclaimer, the term of this patent is extended or adjusted under 35 U.S.C. 154(b) by 104 days.

(21) Appl. No.: 13/576,716

(22) PCT Filed: Jan. 27, 2011

(86) PCT No.: PCT/EP2011/051099
§ 371 (c)(1),
(2), (4) Date: Aug. 15, 2012

(87) PCT Pub. No.: WO2011/095424
PCT Pub. Date: Feb. 11, 2011

(65) Prior Publication Data
US 2012/0305343 A1 Dec. 6, 2012

(30) Foreign Application Priority Data
Feb. 2, 2010 (DE) .......................... 10 2010 006 748

(51) Int. Cl.
*F16D 55/02* (2006.01)
(52) U.S. Cl.
USPC ....... 188/71.8; 188/71.9; 188/196 V; 188/202
(58) Field of Classification Search
USPC ................. 188/71.8, 71.9, 72.7–72.9, 196 B, 188/196 BA, 196 D, 196 R, 196 V, 202
See application file for complete search history.

(56) References Cited

U.S. PATENT DOCUMENTS 4,018,140 A * 4/1977 Engle .................................. 92/31
5,501,305 A * 3/1996 Stalmeir et al. ............... 188/167
(Continued)

FOREIGN PATENT DOCUMENTS

EP 0121815 A1 10/1984
EP 0699846 A2 3/1996
(Continued)

OTHER PUBLICATIONS

Notification Concerning Transmittal of International Preliminary Report on Patentability and Written Opinion of the International Search Authority for International Patent Application No. PCT/EP2011/051099, dated Jan. 27, 2011.
(Continued)

*Primary Examiner* — Pamela Rodriguez
(74) *Attorney, Agent, or Firm* — Barnes & Thornburg LLP (57) ABSTRACT

A disk brake of a rail vehicle, having a brake caliper, the caliper arms of which are coupled with one end to brake shoes and with the other end to a wear adjuster, the length of the wear adjuster is adjustable by a control mechanism depending on the stroke of a brake force motor. A control rod of the control mechanism acts upon an adjusting element of the wear adjuster, the adjusting element includes a freewheeling mechanism mounted in a housing of the wear adjuster and a stop section of the adjusting element loaded in a self-adjusting starting position against a stop of the housing by at least one return spring element. The stop contains at least one element that is elastic in the direction of abutment.

13 Claims, 4 Drawing Sheets

(56) References Cited

U.S. PATENT DOCUMENTS

| | | | |
|---|---|---|---|
| 5,813,499 A * | 9/1998 | Staltmeir et al. | 188/59 |
| 6,722,477 B1 * | 4/2004 | Wolfsteiner et al. | 188/72.9 |
| 2006/0070830 A1 * | 4/2006 | Fuderer et al. | 188/196 V |

FOREIGN PATENT DOCUMENTS

| | | | |
|---|---|---|---|
| EP | 0732247 | A2 | 9/1996 |
| WO | 03082651 | A1 | 10/2003 |

OTHER PUBLICATIONS

English Translation of Notification Concerning Transmittal of International Preliminary Report on Patentability and Written Opinion of the International Search Authority for International Patent Application No. PCT/EP2011/051099, dated Jan. 27, 2011.

Search Report for International Patent Application No. PCT/EP2011/051099; Jul. 27, 2011.

* cited by examiner

PLUNGER ROD ADJUSTER FOR COMPACT BRAKE CALIPER UNITS, HAVING AN ADJUSTING LEVER THAT ABUTS ON AN ELASTIC STOP

PRIORITY CLAIM

This patent application is a U.S. National Phase of International Patent Application No. PCT/EP2011/051099, filed 27 Jan. 2011, which claims priority to German Patent Application No. 10 2010 006 748.2, filed 2 Feb. 2010, the disclosures of which are incorporated herein by reference in their entirety.

FIELD

Disclosed embodiments relate to a disk brake of a rail vehicle, having a brake caliper, wherein the caliper levers of which are coupled at their one end to brake shoes and at their other end to a wear adjuster, wherein the length of the wear adjuster can be set by means of a control mechanism as a function of the stroke of a brake force motor, which control mechanism acts with a control rod on an actuator element of the wear adjuster, wherein the actuator element is mounted with a free wheel in a housing of the wear adjuster and, in an adjustment-free home position, is loaded with a stop section against a stop of the housing by at least one restoring spring element.

BACKGROUND

In compact brake caliper units of rail vehicles, the wear of the brake linings and of the brake disk is compensated automatically by lengthening or shortening a push rod or pull rod adjuster. The lengthening or shortening of the actuator is carried out by means of a helical gearing as a nut-spindle system. In order to achieve the greatest possible adjustment per activation, the thread is embodied with a very large pitch. The thread is, therefore, not self-locking. While the one helical gear element, for example the nut, is secured in a rotationally fixed fashion, the other helical gear element, for example the spindle, is rotatably mounted. By means of an actuation mechanism, an actuator lever with a freewheeling mechanism (for example a sleeve freewheeling mechanism) is rotated, which actuator lever in turn rotates the spindle or the nut of the push rod actuator in such a way that the actuator is, for example, lengthened. The adjustment process is ended when the actuator lever abuts against a stop in the adjuster housing or when an axial force which can no longer be overcome by the actuation mechanism of the actuator builds up in the actuator, for example when the linings come to bear on the brake disk. Such an actuation mechanism is described, for example, in EP 0 732 247 B1, which is of the generic type.

Figure 2:
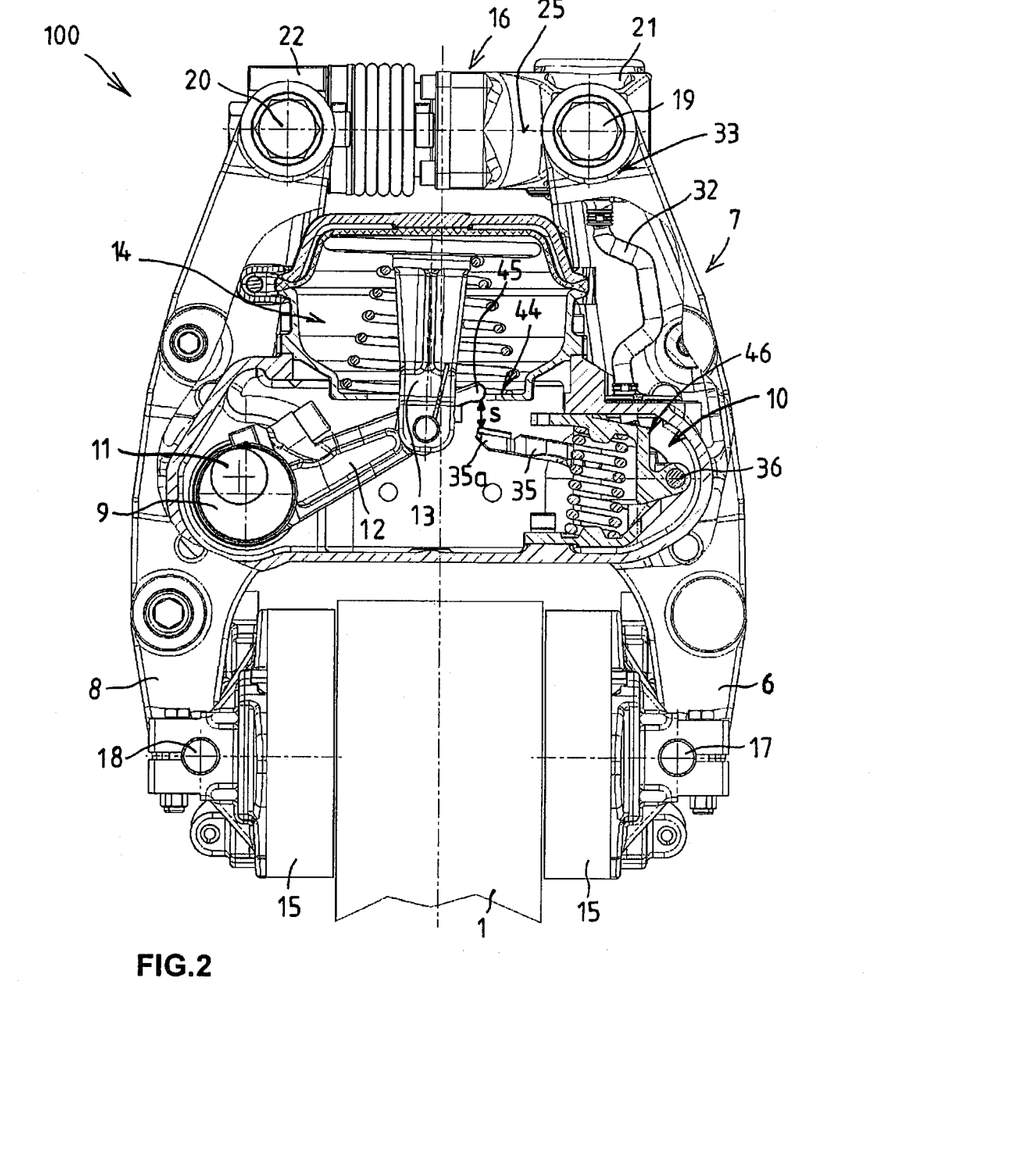
FIG. 2 shows a partially cut-out view of the brake caliper from FIG. 1.

In the version of a push rod adjuster which is disclosed according to FIG. 2 in EP 0 732 247 B1, the nut is secured against rotation in the yoke, and the spindle is rotatably arranged in a guide tube of the adjuster housing. For the purpose of adjustment, the actuator lever is actuated by means of a push rod with a ball head, which push rod engages in a dome of the actuator lever. The spindle is rotated along by means of the sleeve freewheeling mechanism which is pressed into the actuator lever. In this context, the wrap spring freewheeling mechanism slips through in the freewheeling direction. If the push rod releases the actuator lever again when the brake is released, the actuator lever is rotated back again into its home position by means of a restoring spring, in which home position the actuator lever abuts against a rigid stop of the adjuster housing. The sleeve freewheeling mechanism rotates here in the freewheeling direction and in the process the spindle is prevented from rotating along by means of the wrap spring.

EP 0 699 846 B1 also describes a disk brake for rail vehicles having a brake caliper and wear adjuster. In the embodiment as a push rod actuator which is described in the document, the actuator element is formed by an actuator sleeve with outer toothing (reference sign 61 in FIGS. 5 and 6). A sleeve freewheeling mechanism is pressed into this actuator sleeve. A gearwheel segment, by means of which the actuator sleeve can be rotated counter to the force of a restoring spring by means of a lever, is in engagement with the toothing of the actuator sleeve. The nut is entrained by means of the sleeve freewheeling mechanism, as a result of which the push rod adjuster is lengthened. However, the spindle is mounted in a rotationally fixed fashion in the actuator yoke. The restoring spring rotates the actuator sleeve and therefore also the gearwheel segment into the home position, and in the process the gearwheel segment abuts against a rigid stop on the adjuster housing.

In the case of a push rod adjuster, a rotation, for example of the spindle of the spindle-nut gear mechanism in a direction which shortens the push rod adjuster, is prevented by a wrap spring freewheeling mechanism between the spindle and the adjuster housing. This wrap spring freewheeling mechanism forms, in addition to the freewheeling mechanism of the actuator element, a further or second freewheeling mechanism. As a result of the wrap spring freewheeling mechanism, the spindle is held in its position when the actuator element is rotated back into its home position by the force of its restoring spring and/or when a large brake application force, and therefore a large torque, acts on the spindle during a braking operation. If such a wrap spring freewheeling mechanism is loaded by a torque, the mechanism experiences elastic deformation which results, on the one hand, from stretching lengthening of the spring wire and, on the other hand, from a wrapping orientation of the turns on the parts to be coupled, for example the spindle and adjuster housing. Under extreme conditions of use, oscillations which are applied from the outside can bring about an increase in the elastic stretching in that they locally reduce the coefficient of friction among individual turns and as a result more turns are involved in the transmission of torque. If the wrap spring freewheeling mechanism under load has an excessively large elastic deformation or degree of stretching in the locking direction, the torque which acts in the helical gearing has to be partially or even entirely supported via the sleeve freewheeling mechanism of the actuator element if the actuator element is in its home position on the stop of the adjuster housing. It is then not possible to rule out damage to the sleeve freewheeling mechanism and therefore degrading of the function of the wear adjuster.

SUMMARY

Disclosed embodiments prevent overloading of the wear adjuster in a disk brake of the type mentioned at the beginning.

Overloading of the freewheeling mechanism of the actuator element can be prevented if the stop for the actuator element which is located in its home position includes at least one element which is elastic in the stop direction. The stop can then move out in the case of excessively high torque.

This enables better protection of the freewheeling mechanism of the actuator element against overloading in the case of extreme conditions of use with high vibration loading.

Furthermore, the requirements made of the further or second freewheeling mechanism, for example in the form of a wrap spring freewheeling mechanism, in terms of manufacturing accuracy can be reduced because then the freewheeling mechanism can deform to a greater extent under high stressing, which has a favorable effect on the cost.

BRIEF DESCRIPTION OF FIGURES

Exemplary embodiments of the invention are illustrated below in the drawing and explained in more detail in the following description. In the drawing.

DETAILED DESCRIPTION OF DISCLOSED EMBODIMENTS

In accordance with disclosed embodiments, the actuator element assumes the adjustment-free home position in which it is loaded by the restoring spring element, for example in the case of a release position of the brake or in the case of a brake application position of the brake when there is no requirement for adjustment by the wear adjuster.

The at least one elastic element is particularly preferably prestressed, wherein the prestressing force of the elastic element is greater than the force of the at least one restoring spring element which loads the actuator element against the stop.

In the case of a high degree of elastic deformation of the wrap spring of the wrap spring freewheeling mechanism, the prestressed elastic element, for example a compression spring, is overridden. The torque acting on the actuator element and therefore on the sleeve freewheeling mechanism is then limited to the torque which is exerted by the force applied by the elastic element, for example a spring force.

In the adjuster housing, at least one prestressed compression spring is preferably positioned as an elastic element in such a way that the actuator element comes to bear on the compression spring if the actuator element is rotated into its home position by the force of the restoring spring element. Since the prestressing force of the prestressed compression spring is greater than the force of the restoring spring, a defined home position of the actuator element is ensured. On the other hand, the prestressing force of the at least one elastic element is only of such a magnitude that the torque which acts on the freewheeling mechanism of the actuator element when the at least one elastic element is loaded by the actuator element is smaller than the torque which can be tolerated by the freewheeling mechanism of the actuator element.

For these reasons, the at least one elastic element is preferably elastically deformed if the force acting as a result of the actuator element is greater than a predefined limiting force, wherein otherwise substantially no elastic deformation of the at least one elastic element takes place.

For the purpose of implementation, the at least one compression spring can be accommodated in a housing recess in the adjuster housing of the wear adjuster and be supported there by both ends in a prestressed fashion, wherein the at least one compression spring makes contact with the actuator element via a pressure piece which is displaceably mounted in the housing recess.

In particular, the at least one elastic element, that is to say preferably a compression spring, is held here in the interior of a hollow screw which is screwed into a drilled through-hole in the adjuster housing from the outside. Such an elastic stop can then be easily retrofitted in an already existing wear adjuster by producing a threaded drilled hole in the adjuster housing of the wear adjuster and screwing the hollow screw with the prestressed compression spring and the pressure piece into the threaded drilled hole.

In addition to the stop which is assigned to the home position of the actuator element and provided with an elastic element there is a further stop in the adjuster housing of the wear adjuster, against which stop the actuator element abuts with a further stop section if the wear adjuster adjusts by a maximum adjustment travel.

Figure 1:
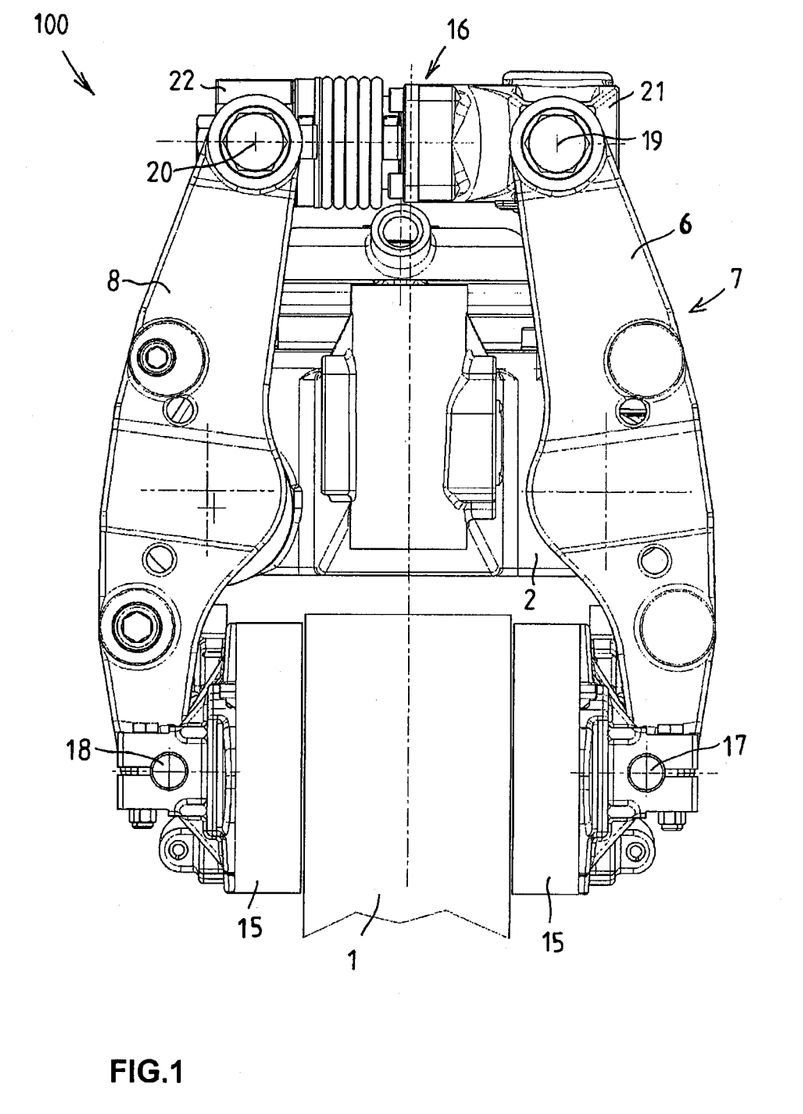
FIG. 1 shows a plan view of a disk brake of a rail vehicle having a push rod adjuster of a brake caliper as a wear adjuster according to one preferred embodiment of the invention.

FIGS. 1 and 2 show a disk brake 100 for, in particular, laterally displaceable wheel sets of rail vehicles, having an eccentrically driven brake caliper 7, the two caliper levers 6, 8 of which are coupled at their one end to brake shoes 15 and at their central regions to a braking force motor 14. The brake caliper 1 is only partially illustrated as an axial disk.

One caliper lever 6 of a brake caliper 7 is coupled, so as to be rotatable about a rotational axis, to a brake housing 2, at a coupling point 10 which can be considered to be secured in a spatially fixed fashion. The caliper lever 8 on the other side is coupled, so as to be rotatable, to the brake housing 2 at a coupling point 10 by means of a bolt 9, which bolt 9 is mounted here on the brake housing 2 so as to be rotatable about a rotational axis which is parallel to the rotational axis of the caliper lever 6, and which bolt 9 has eccentrically axis-parallel bolt projections 11, on which the caliper lever 8 is mounted.

A rotating arm 12, to whose end the piston rod of a brake cylinder is coupled as a force output element 13 of a braking force motor 14, projects from the bolt 9. The two caliper levers 6 and 8 are rotatably coupled, at their one ends, to brake shoes 15 which can be pressed against the brake disk 1, and, at their other ends, to a wear adjuster 16 which connects them, in the exemplary embodiment a push rod adjuster, at coupling points 17, 18, 19 and 20. The push rod adjuster 16 or its adjuster housing is provided for coupling to bearing parts 21 and 22 which each extend between the two cheeks of the caliper levers 6 and 8.

When pressure medium is applied to the, for example pneumatic, braking force motor 14, the force output element 13 thereof rotates the rotating lever 12, as a result of which, due to the eccentric arrangement of the bolt projections 11, the caliper lever 8 is rotated about its coupling point 20 with respect to the push rod adjuster 16 in the direction in which its brake shoe 15 presses against the brake disk 1. The design and the method of functioning of the eccentric brake application of the brake caliper 7 therefore correspond to those disclosed in the already mentioned EP 0 732 247 A2. After the brake shoe 15, assigned to the caliper lever 8, comes to bear against the brake disk 1, the caliper lever 8 rotates about its coupling point 18 to this brake shoe 15, wherein the caliper lever 6 is rotated about the coupling point 10, via the coupling point 20, the rod 16 and the coupling point 19, in order for its brake shoe 15 to come to bear against the brake disk 1.

The push rod adjuster 16 increases its length in accordance with the wear of the brake shoes 15. For this purpose, it has an actuator lever 24 which is mounted, so as to be rotatable about a longitudinal axis 25 of the push rod adjuster 16, on the bearing part 21 which is assigned to the caliper lever 6. A pin-shaped stop section 23 of the actuator lever 24 is forced into its home position and against a stop 37 (illustrated in FIGS. 3 to 8) by means of a restoring spring 26 which is supported against the bearing part 21.

Figure 3:
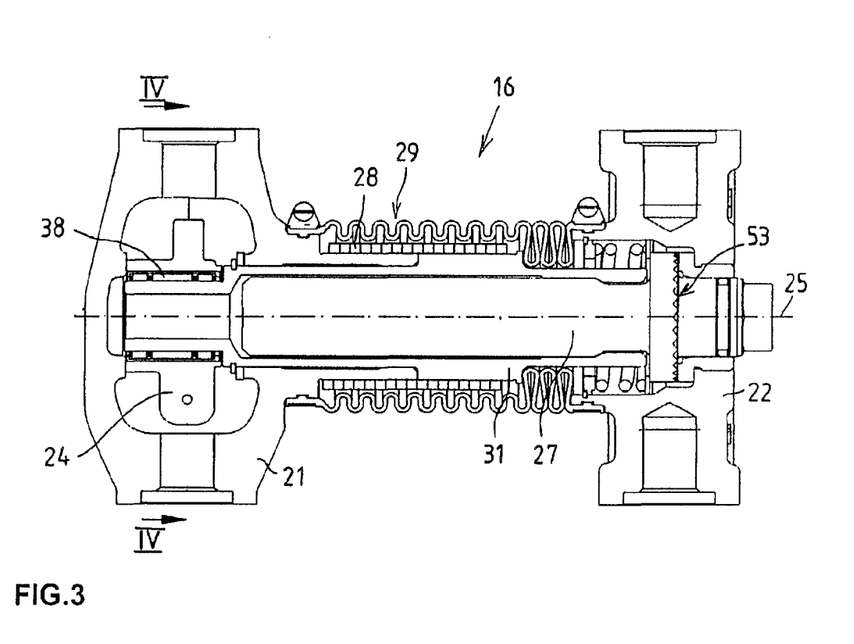
FIG. 3 shows a cross-sectional illustration of the push rod adjuster of the disk brake from FIG. 1.

As is apparent from FIG. 3, an extending threaded spindle 27, which is secured against rotation by means of a prestressed toothing 53, is secured coaxially with respect to the longitudinal axis 25 and in a rotationally fixed and axially non-displaceable fashion in the bearing part 22. In contrast, an actuator nut 31 which is screwed to the threaded spindle 27 is secured to the bearing part 21, such that it can rotate. The actuator nut 31 can be coupled to the bearing part 21 via a one-way rotating coupling or a wrap spring freewheeling mechanism 29 which is equipped with a wrap spring 28. On the other hand, the actuator nut 31 is driven in the lengthening direction of the push rod adjuster 16 by means of the actuator lever 24 via the sleeve freewheeling mechanism 38. The basic design and method of functioning of such wear adjusters with two one-way rotating couplings or freewheeling mechanisms are generally known and therefore do not need to be described in detail. However, other types of wear adjusters, for example pull rod adjusters, can also be used, all that is significant is that the wear adjuster has an actuator element which corresponds to the actuator lever 24.

In the illustrated embodiment according to FIG. 3, the threaded spindle 27 is mounted in a rotationally fixed fashion, while the actuator nut 31 is mounted in a rotatable fashion, in the adjuster housing 21, 22. The wrap spring 28 supports the torque arising during the axial force, from the actuator nut 31, directly on the adjuster housing or on the bearing part 21. By the actuator lever 24 with the sleeve freewheeling mechanism 38, the tube nut 31 can be rotated into the push rod adjuster in order to perform wear adjustment of the lengthening direction. However, an embodiment, for example according to EP 0 732 247 A2, is also conceivable in which the threaded spindle 27 is rotatably driven by the actuator lever 24, and the actuator nut 31 is mounted in a rotationally fixed fashion.

A control rod 32, whose rounded, rear end bears against the free end of the actuator lever 24 in a bearing seat, extends between the two cheeks of the caliper lever 6. The control rod 32 is therefore coupled to the activation lever 24 via coupling point 33, but the activation lever 24 is not shown in FIG. 2. In its central region, the control rod 32 is bent out toward the outside of the brake caliper in order to avoid collisions with other components, in particular the braking force motor 14. The front, likewise rounded, end of the control rod 32 rests in a bearing seat (not shown here) of a rotating lever 35, as can be seen from FIG. 2. The two-arm rotating lever 35 is rotatably mounted in its central region at an articulation point 36 and has a free limb 35a. The method of functioning of the rotating lever 35 in relation to adjoining components is explained in detail in EP 0 732 247 A2.

The free end 35a of the rotating lever 35 is located opposite a lever part 45 at a distance s on the brake disk side in order to form an idle stroke device 44, as is apparent from FIG. 2. The lever part 45 is embodied as an extension of the rotating arm 12. Taking a disk brake which is released with the correct release stroke as basis, the distance s corresponds to the travel which the end of the lever part 45 executes when the two brake shoes 15 come to bear against the brake disk 1 in a way which is still free of brake application force. When the brakes come to bear, the lever part 45 just abuts against the limb 35a of the rotating lever 35.

Taking an excessively large release stroke of the disk brake, due for example to brake shoe wear, as the basis, during a brake application process, starting from the point when the release excess travel begins to be overcome, the lever part 45 entrains, during its further movement, the limb 35a until the bearing point of the brake is reached with accompanying rotation of the rotating lever 35, the control rod 32 being moved in the direction of the actuator lever 24 and in the process activating the push rod adjuster 16. The brake-disk-side front end of the control rod 32 can therefore be coupled to the force output element 13 of the braking force motor 14 via a coupling point 46 which also includes the rotating lever 35.

In a refinement of the described exemplary embodiment, the caliper levers on the brake caliper can be coupled centrally to a pull rod adjuster 16, which can be activated in the shortening direction of the pull rod adjuster by an actuator lever 24. The wear adjuster 16 can be of any desired design, all that is necessary is to have an actuator lever, as already mentioned. The securing of the brake caliper to a spatially fixed part, ultimately a vehicle frame or chassis frame, can take place at a coupling point other than the coupling point 10, and the design of a brake caliper unit can possibly be dispensed with, along with the brake housing. The brake caliper 7 can also be applied in a different way, in one of the many known ways, for example by means of a brake cylinder which is coupled directly to the caliper levers 6, 8 or by means of a lever mechanism.

The length of the push rod adjuster can therefore be adjusted as a function of the stroke of the braking force motor by means of a control mechanism which acts with a control rod 32 on the actuator lever 24 of the push rod adjuster 16. As is apparent, in particular, from FIG. 3 to FIG. 8, the actuator lever 24 is mounted with a sleeve freewheeling mechanism 38 in the adjuster housing or bearing part 21 of the push rod adjuster 16, and in an adjustment-free home position the actuator lever 24 is loaded with the pin-shaped stop section 23 against a stop 37 of the bearing part 21 or a cover 21a of the bearing part 21 by the restoring spring 26. This situation is shown, in particular, in FIG. 4 in which the actuator lever 24 is located in its spring-loaded home position.

Figure 4:
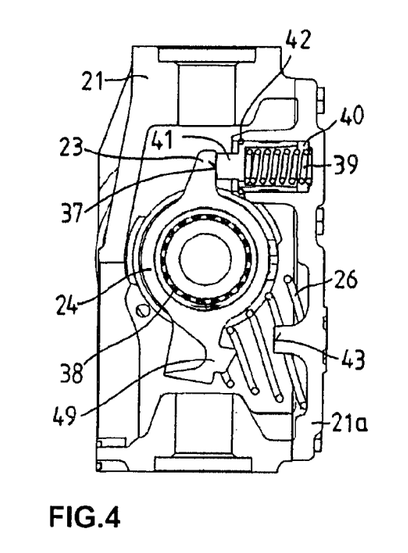
FIG. 4 shows a cross-sectional illustration along the line IV-IV from FIG. 3, showing an actuator element in its home position and mounted with a sleeve freewheeling mechanism in an adjuster housing.

The stop 37 for the actuator element 24 which is located in its home position includes at least one element 39, preferably a compression spring, which is elastic in the stop direction. The compression spring 39 is prestressed, with its prestressing force being greater than the force of the restoring spring 26 which loads the actuator lever 24 against the stop 37. The compression spring 39 is positioned in the bearing part 21 or the cover 21a thereof in such a way that the actuator lever 24 comes to bear thereon when it is rotated into its home position by the force of the restoring spring 26. Since the prestressing force of the prestressed compression spring 39 is greater than the force of the restoring spring 26, a defined home position of the actuator lever 24 is ensured.

Figure 6:
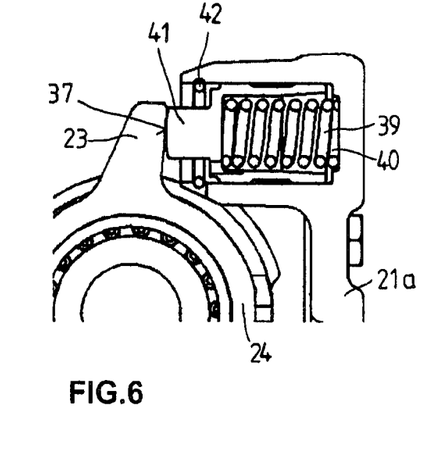
FIG. 6 shows an enlarged detail from FIG. 5.

In particular, the compression spring 39 is accommodated in a, for example cylindrical, recess 40 of the bearing part 21 or cover 21a thereof of the push rod adjuster 16 and is supported there by both ends in a prestressed fashion, wherein the compression spring 39 makes contact with the actuator lever 24 via a pressure piece 41 which is displaceably mounted in the stop direction in the recess 40, as is shown best by FIG. 4 and FIG. 6. The pressure piece 41 is prevented, for example by a circlip 42 inserted into a radially inner annular groove of the recess 40 in the cover 21a, from exiting the recess 40 and as a result the pressure piece 41 generates the prestress of the compression spring 39. To be more precise, the pressure piece 41 is stressed axially by the compression spring 39, which is under prestress, against a stop which is formed in the recess 40, the stop being formed by the circlip 42 here. By reference to FIG. 4 it is easy to see that owing to the cover 21a the compression spring 39, the pressure piece 41 and the restoring spring 26 are easy to mount.

The restoring spring 26, here preferably a conical spring, secures the actuator lever 24 in its home position. The actuator lever 24 bears here against the pressure piece 41 which is displaceably mounted in the bearing part 21 in the recess 40, configured for example as a drilled blind hole, which actuator lever 24 can be moved counter to the prestressed compression spring 39.

Figure 5:
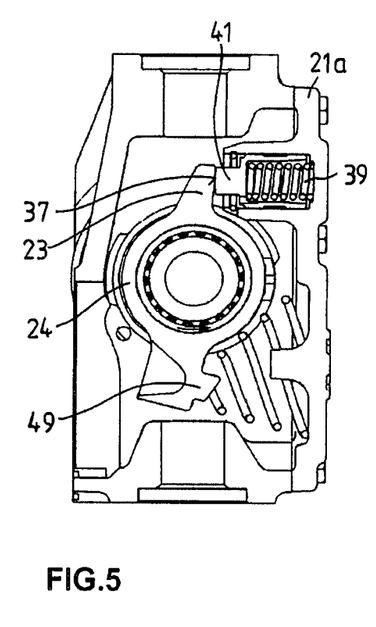
FIG. 5 shows the actuator element from FIG. 4 in a position in which it is loaded beyond the home position.
Figure 7:
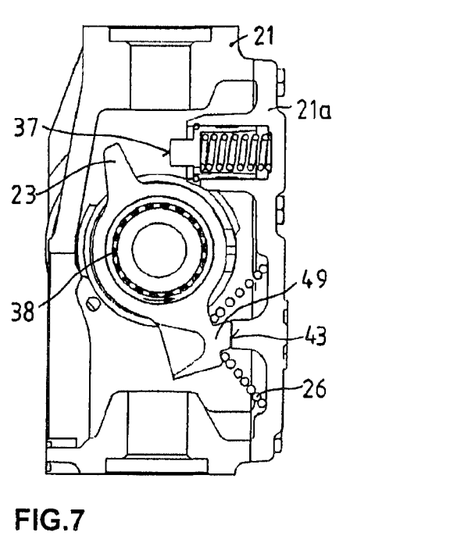
FIG. 7 shows the actuator element from FIG. 4 in a position corresponding to a maximum adjustment travel of the push rod adjuster from FIG. 3.
Figure 8:
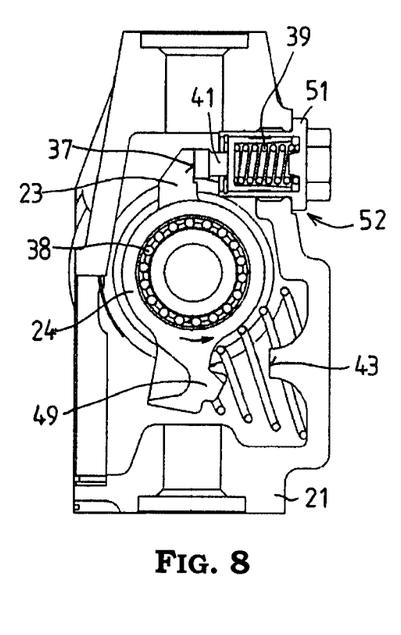
FIG. 8 shows a cross-sectional illustration of a further embodiment of a push rod adjuster.

As can be seen in FIGS. 4, 5 and 7, in addition to the stop 37, assigned to the home position of the actuator lever 24 and with the compression spring 39, a further stop 43 is provided in the bearing part 21 or the cover 21a thereof, against which stop 43 the actuator lever 24 abuts with a further pin-shaped stop section 49 counter to the effect of the restoring spring 26 if the push rod adjuster 16 adjusts by a maximum adjustment travel. This situation is shown in FIG. 7.

In the case of large elastic deformation of the wrap spring 28 of the wrap spring freewheeling mechanism 29, the compression spring 39 is overridden, as shown in FIG. 5 and FIG. 6. The torque acting on the actuator lever 24, and therefore on the sleeve freewheeling mechanism 38, is then limited to the torque or the force which is applied to the sleeve freewheeling mechanism 38 by the compression spring 39. In the case of elastic deformation of the compression spring 39, the pressure piece 41 is, as shown in FIG. 6, moved by a certain amount into the recess or drilled blind hole 40 and lifts off from the circlip 42, which otherwise, in the home position, forms the axial stop for the pressure piece 42.

If the wrap spring freewheeling mechanism 29 therefore permits a certain rotation of the tube nut 31 in the shortening direction because of elastic stretching under load, the actuator lever 24 can follow this rotation counter to the force of the compression spring, and in the process the pressure piece 41 moves linearly (see FIG. 6). The sleeve freewheeling mechanism 38 is loaded in the process only by the torque which results from the spring force of the compression spring 39 and the distance between its line of action and the rotational axis of the actuator nut 31, which is coaxial to the longitudinal axis 25.

According to a further embodiment (shown in FIG. 8), the compression spring 39 and the pressure piece 41 are held in the interior of a hollow screw 51 which is screwed into a drilled through-hole 52 which is formed as a threaded drilled hole in the bearing part 21 from the outside. Such an elastic stop 37 can then be easily retrofitted in an already existing push rod adjuster 16. Otherwise, the design and the method of functioning of the elastic stop 37 are as described in the preceding exemplary embodiment. Last but not least, the embodiment according to FIG. 8 eliminates the need for the cover 21a in the embodiment according to FIG. 4 to FIG. 6.

According to a further exemplary embodiment (not illustrated here), the elastic element can be embodied as any desired elastic element, instead of as a compression spring 39. In particular, an embodiment as a conical spring or as an elastomer which is vulcanized to the adjuster housing or bearing part 21 or arranged or mounted separately is conceivable.

Last but not least, an embodiment of the elastic element as a section which is in one piece with the bearing part 21 and which, owing to a particular geometric configuration, has a higher degree of elasticity than the regions of the bearing part 21 adjoining it, is conceivable. In this case, the relatively high resilience or elasticity does not result from a lower material rigidity but rather from a geometrically induced lower rigidity of the stop 37 compared to the adjoining regions of the bearing part 21.

LIST OF REFERENCE NUMBERS

1 Brake disk
2 Brake housing
6 Caliper lever
7 Brake caliper
8 Caliper lever
9 Bolt
10 Coupling point
11 Bolt projection
12 Rotating arm
13 Force output element
14 Braking force motor
15 Brake shoe
16 Push rod adjuster
17 Coupling point
18 Coupling point
19 Coupling point
20 Coupling point
21 Bearing part
21a Cover
22 Bearing part
23 Stop section
24 Actuator lever
25 Longitudinal axis
26 Restoring spring
27 Threaded spindle
28 One-way rotational coupling
29 One-way rotational coupling
31 Actuator nut
32 Control rod
33 Coupling point
35 Rotating lever
35a End
36 Articulation point
37 Stop
38 Sleeve freewheeling mechanism
39 Compression spring
40 Recess
41 Pressure piece
42 Circlip
43 Stop
44 Idle stroke device
45 Lever part
46 Coupling point
49 Bearing section
51 Hollow screw
52 Drilled through-hole
53 Toothing
100 Disk brake

The invention claimed is:

1. A disk brake of a rail vehicle, having a brake caliper, the caliper levers of which are coupled at their one end to brake shoes and at their other end to a wear adjuster, wherein the length of the wear adjuster is set by a control mechanism as a function of the stroke of a braking force motor, which control mechanism acts with a control rod on an actuator element of the wear adjuster, wherein the actuator element is mounted with a freewheeling mechanism in a housing of the wear adjuster and, in an adjustment-free home position, is loaded with a stop section against a stop of the housing by at least one restoring spring element, wherein the stop includes at least one element which is elastic in the stop direction.

2. The disk brake of claim 1, wherein the at least one elastic element is prestressed, and wherein the prestressing force of the elastic element is greater than the force of the at least one restoring spring element which loads the actuator element against the stop.

3. The disk brake of claim 2, wherein the at least one elastic element is elastically deformed if the force acting on the elastic element by the actuator element is greater than a predefined limiting force, and in that otherwise substantially no elastic deformation of the elastic element takes place.

4. The disk brake of claim 3, wherein the elastic element is formed by at least one prestressed compression spring.

5. The disk brake of claim 4, wherein the at least one compression spring is accommodated in a recess in the housing of the wear adjuster and is supported thereby both ends in a prestressed fashion, wherein the at least one compression spring makes contact with the actuator element via a pressure piece which is displaceably mounted in the recess.

6. The disk brake of claim 2, wherein the elastic element is formed by at least one prestressed compression spring.

7. The disk brake of claim 6, wherein the at least one compression spring is accommodated in a recess in the housing of the wear adjuster and is supported thereby both ends in a prestressed fashion, wherein the at least one compression spring makes contact with the actuator element via a pressure piece which is displaceably mounted in the recess.

8. The disk brake of claim 1, wherein the at least one elastic element is held in the interior of a hollow screw, which is screwed into a drilled through-hole in the housing from the outside.

9. The disk brake of claim 1, wherein the actuator element assumes the adjustment-free home position in the case of a release position of the brake or in the case of a brake application position of the brake if there is no requirement for adjustment by the wear adjuster.

10. The disk brake of claim 1, wherein the restoring spring element contains at least one compression spring.

11. The disk brake of claim 10, wherein the at least one compression spring is formed by a conical spring.

12. The disk brake of claim 10, wherein the at least one compression spring is formed by a conical spring.

13. The disk brake of claim 1, wherein a further stop for the actuator element is formed on the housing, against which stop the actuator element abuts with a further stop section if the wear adjuster adjusts by a maximum adjustment travel.

\* \* \* \* \*